United States Patent
Dutta et al.

(10) Patent No.: US 9,424,001 B2
(45) Date of Patent: *Aug. 23, 2016

(54) PARTIAL UPDATING OF DIAGRAM DISPLAY

(75) Inventors: Suhail Dutta, Kirkland, WA (US); Pedro Silva, Redmond, WA (US); John J. Jordan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 757 days.

This patent is subject to a terminal disclaimer.

(21) Appl. No.: 13/610,811

(22) Filed: Sep. 11, 2012

(65) Prior Publication Data

US 2013/0007652 A1    Jan. 3, 2013

Related U.S. Application Data

(63) Continuation of application No. 12/147,583, filed on Jun. 27, 2008, now Pat. No. 8,291,331.

(51) Int. Cl.
*G06F 3/0481* (2013.01)
*G06F 9/44* (2006.01)

(52) U.S. Cl.
CPC ............... *G06F 8/10* (2013.01); *G06F 3/0481* (2013.01); *G06F 9/4443* (2013.01)

(58) Field of Classification Search
CPC .............................. G06F 3/0481; G06F 9/4443
USPC ........................................................ 715/764
See application file for complete search history.

(56) References Cited

U.S. PATENT DOCUMENTS

| | | | |
|---|---|---|---|
| 6,330,527 B1 | 12/2001 | Jung et al. | |
| 6,535,229 B1* | 3/2003 | Kraft | ............................ 715/764 |
| 6,714,217 B2 | 3/2004 | Huang et al. | |
| 6,804,686 B1 | 10/2004 | Stone et al. | |
| 7,050,056 B2* | 5/2006 | Meyringer | .................... 345/440 |
| 7,137,075 B2* | 11/2006 | Hoshino | ............. G06F 3/04815 348/E5.097 |
| 7,356,777 B2* | 4/2008 | Borchardt | ........... G06F 3/04815 345/441 |
| 7,506,273 B2* | 3/2009 | Lahiri | ............................ 715/854 |
| 7,720,940 B1* | 5/2010 | Wilsey | .................... H04L 41/12 709/220 |
| 7,870,507 B2* | 1/2011 | Borchardt | ........... G06F 3/04815 715/810 |
| 8,291,331 B2* | 10/2012 | Dutta | ........................ G06F 8/10 715/764 |
| 8,595,625 B2* | 11/2013 | Hung | .................. H04L 41/0846 709/220 |

(Continued)

OTHER PUBLICATIONS

"Drawing Sequence Diagram with Real-Time Layout", retrieved at <<http://oldresources.visual-paradigm.com/uml_diagrams/sequence_diagram/drawing_sequence_diagram_with_real-time_layout.html>>, pp. 3.

(Continued)

*Primary Examiner* — David Phantana Angkool

(74) *Attorney, Agent, or Firm* — Kevin Sullivan; Micky Minhas

(57) ABSTRACT

A creation, editing, and display tool for complex diagrams may enable portions of the diagram to be updated without having to update the entire diagram. The tool may use a set of rules that define the positioning and layout of various elements and relationships between elements in the diagram. The update mechanism may enable the rules to be applied to a subset of the diagram and may not update some portions of the diagram, such as those elements outside the viewing area. In some embodiments, a background or low priority process may apply the rules to those portions not updated. The tool may be used for various diagrams, including sequence diagrams and other complex, highly restrained diagram types.

20 Claims, 4 Drawing Sheets

(56) References Cited

U.S. PATENT DOCUMENTS

| | | | |
|---|---|---|---|
| 8,819,271 B2* | 8/2014 | Hilving | H04L 12/4675 370/253 |
| 8,924,865 B1* | 12/2014 | Tiwari et al. | 715/753 |
| 2002/0145623 A1* | 10/2002 | Decombe | 345/734 |
| 2003/0212778 A1 | 11/2003 | Collomb | |
| 2004/0243944 A1 | 12/2004 | Sabiers et al. | |
| 2006/0161890 A1 | 7/2006 | Green | |
| 2007/0044032 A1* | 2/2007 | Mollitor et al. | 715/764 |

OTHER PUBLICATIONS

"EventStudio Sequence Diagram Designer 2.5", File Transit, 1998-2007, pp. 3.

Poranen, et al., "How to Draw a Sequence Diagram", pp. 91-104.

Gogolla, et al., "Towards Three-Dimensional Representation Arid Animation of UML Diagrams", pp. 1-12.

Eiglsperger, "Automatic Layout of UML Class Diagrams: A Topology-Shape-Metrics Approach", Tubingen 2003, pp. 185.

"Sequence Diagram Editor", 2005-2007, Effexis Software, LLC., pp. 2.

"Catalog of OMG Modeling and Metadata Specifications", retrieved at <<http://www.omg.org/technology/documents/modeling_spec_catalog.htm#UML>>, pp. 5.

* cited by examiner

200
EXAMPLE OF A
SEQUENCE DIAGRAM

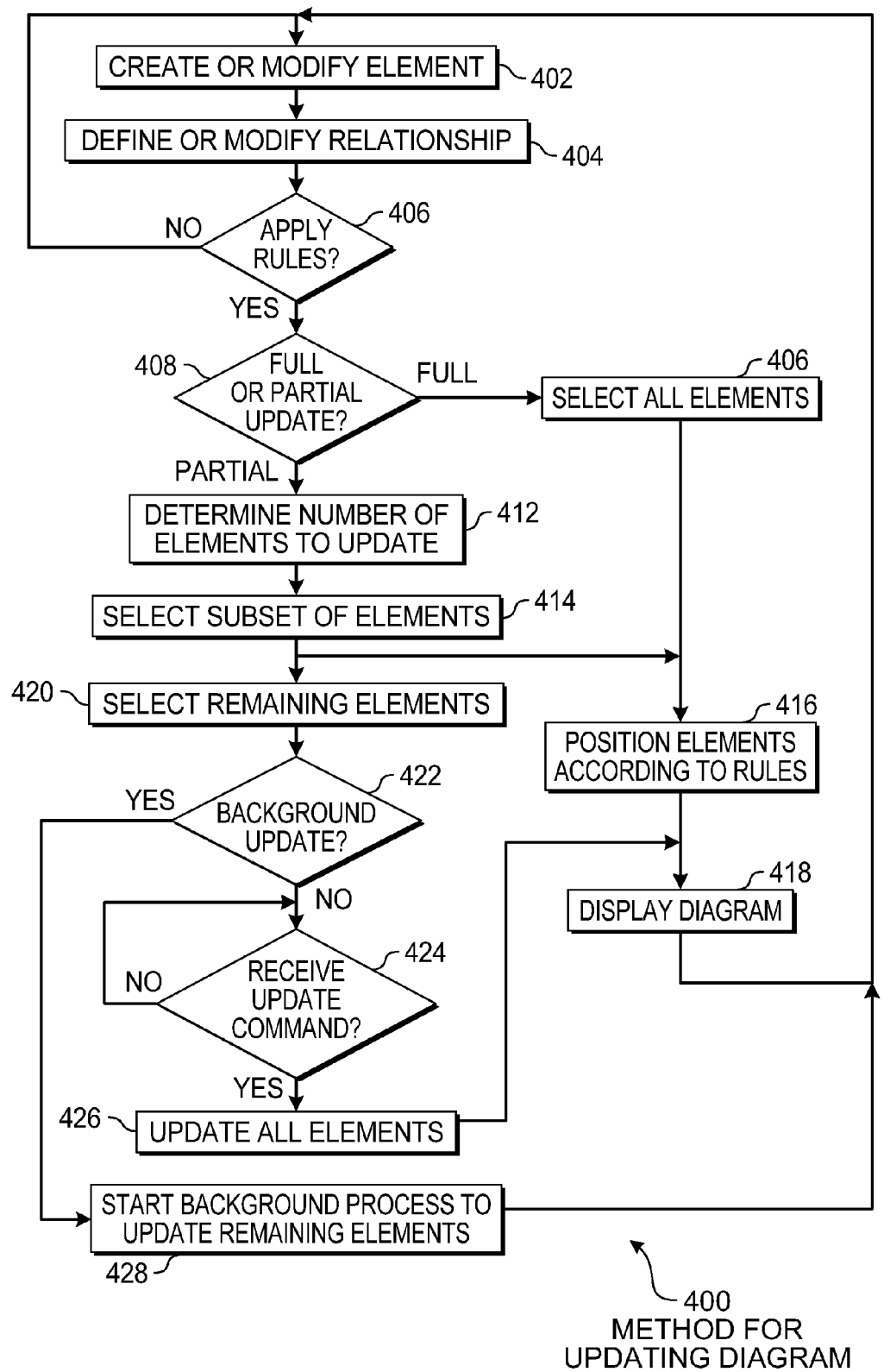

PARTIAL UPDATING OF DIAGRAM DISPLAY

BACKGROUND

Many types of diagrams may contain various elements that may be connected to other elements by relationships. An example may be a Gantt chart or a Unified Modeling Language (UML) sequence diagram. In both types of diagrams, various elements of the diagram may be connected by different types of relationships. For example, a first element may have a dependent relationship on a second element, which may cause the second element to be displayed in series with the first element.

The elements and their relationships with other elements may be defined with various rules. For example, a sequence diagram may be defined such that communications between different elements are shown as horizontal lines. Diagonal lines may not be used within a sequence diagram to show communications, for example.

Diagrams may be used to describe very complex and intricate processes or concepts. As the diagrams become very large, subsets of diagrams may be displayed on a user interface and a user may be able to scroll or pan across various portions of the diagram.

SUMMARY

A creation, editing, and display tool for complex diagrams may enable portions of the diagram to be updated without having to update the entire diagram. The tool may use a set of rules that define the positioning and layout of various elements and relationships between elements in the diagram. The update mechanism may enable the rules to be applied to a subset of the diagram and may not update some portions of the diagram, such as those elements outside the viewing area. In some embodiments, a background or low priority process may apply the rules to those portions not updated. The tool may be used for various diagrams, including sequence diagrams and other complex, highly restrained diagram types.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 4 is a flowchart illustration of an embodiment showing a method for updating a diagram.

DETAILED DESCRIPTION

Figure 1:
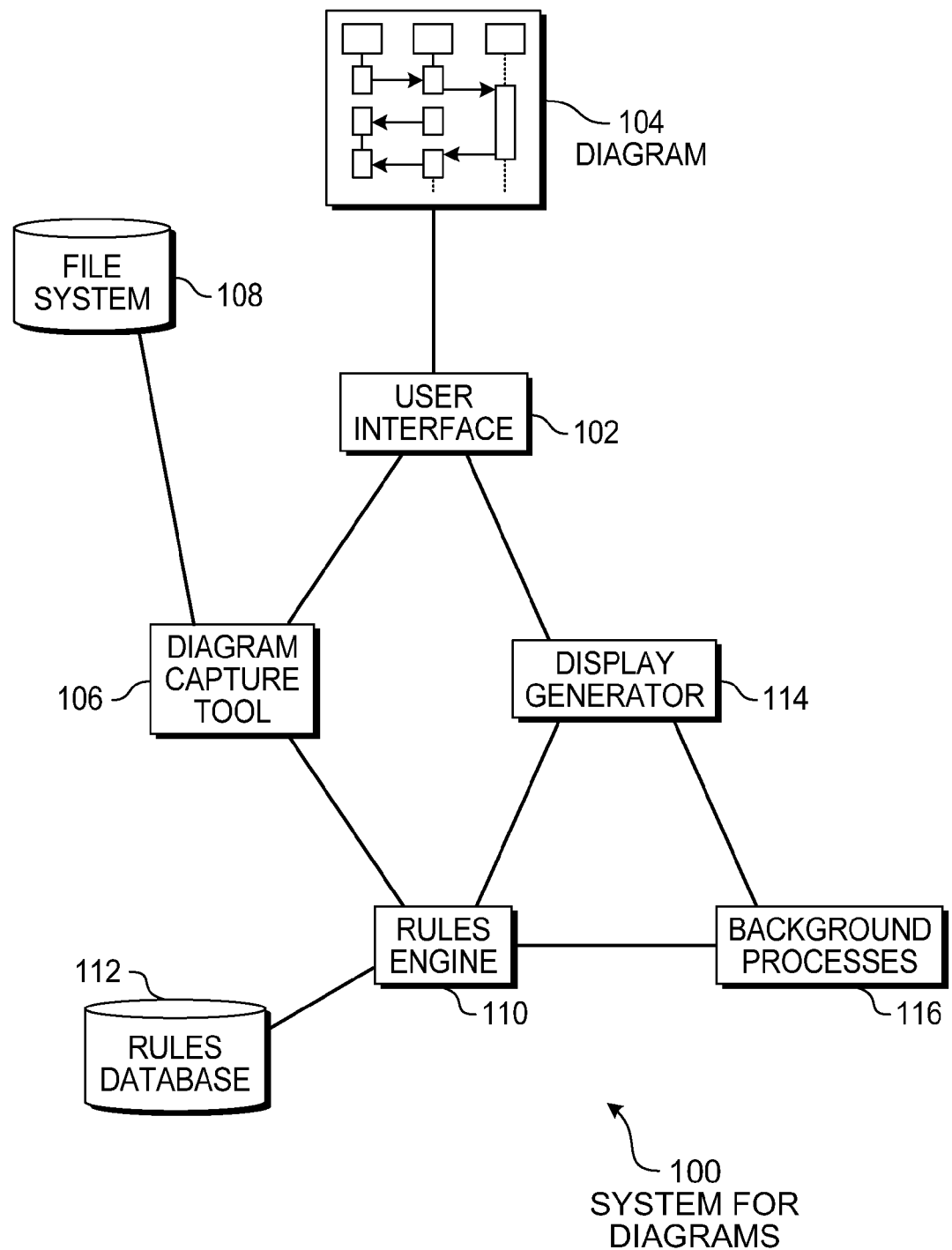
FIG. 1 is a diagram illustration of an embodiment showing a system for creating and modifying diagrams.

A system for creating, editing, and displaying diagrams may update a portion of the diagram and display the updated portion. The remaining portion of the diagram may be updated when requested or as a background process. The diagram may have various elements that may have relationships to other elements. A set of rules may define how the relationships may be positioned with respect to each other based on the relationships.

The system may be used for displaying any type of diagram, and may be particularly useful for complex diagrams such as Gantt charts and UML sequence diagrams.

In a typical use scenario, a subset of the diagram may be selected, such as the subset of the diagram that is displayed on a user interface. When the subset is manipulated by the user such that an update may be performed to the layout of the diagram, the update may be quickly performed on the subset. The updated subset may be displayed quickly without having to analyze the remainder of the diagram.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for creating, editing, and displaying diagrams. Embodiment 100 is an example of a system that may be used for operations on large and complex diagrams.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a system for creating, editing, and displaying complex diagrams that may be defined using a set of rules. The rules may define how various elements may be displayed based on the elements and relationships between the elements. Many diagram types may have several different types of elements and different types of relationships. One example of such a diagram may be a sequence diagram, such as the sequence diagrams or variations of sequence diagrams as specified in the Uniform Modeling Language (UML).

The functional parts of embodiment 100 may be contained in a single desktop computer or workstation. In some embodiments, some functional parts may be performed by server computers, high performance computers, or other devices connected via a communication network.

Embodiment 100 is an example of a system that may be capable of updating a portion of a diagram and displaying the updated portion without having to update the entire diagram. When a diagram becomes very large and the rules defining the diagram complex, the processing time to update and render a diagram may increase. By updating a subset of the diagram, the processing time may be drastically reduced and may enable a user to interact with the diagram without processing delays that may reduce the performance of the system.

When a portion of the diagram is changed by adding, removing, or modifying an element or relationship between elements, a subset of the elements may be selected for updating. The subset may be updated and displayed for the user, and the remaining elements may be processed using a background operation or may be processed when the user requests that the entire diagram be updated.

The set of rules may describe how the elements and relationships between elements may be presented in the diagram. For example, in a Gantt chart, a first task element that is dependent on a second task element may be displayed sequentially from the first element and with an arrow that indicates the dependency. The rules describing the Gantt chart may describe how the second task element may be positioned with respect to the first task element, for example.

The system of embodiment 100 may have a user interface 102 through which a user may enter various elements and relationships to create, modify, and view the diagram 104. The user interface 102 may be any type of user interface, with a typical embodiment comprising a display device that may have a graphical user interface, and various input devices such as a keyboard and pointing device. The specific type of user interface and capabilities of the user interface may vary with the application.

A diagram capture tool 106 may receive input from the user interface 102 to create, modify, delete, and otherwise manipulate elements and relationships between the elements. The diagram capture tool 106 may also store and receive diagram definitions from a file system 108. The diagram capture tool 106 may have a graphical user interface through which a user may perform any type of manipulation of the diagram.

The diagram definitions, as received by the diagram capture tool 106, may be processed in whole or in part by the rules engine 110. The rules engine 110 may apply various rules from a rules database 112 to position various elements with respect to each other based on the elements and relationships between the elements.

The rules engine 110 may analyze the elements defined in the diagram and position those elements to satisfy the rules associated with the diagram.

In some cases, a user may create a diagram or attempt to create a diagram that may not conform to one or more rules. In such a case, the rules engine 110 may include algorithms, methods, or rules for determining how to handle a violation or incompatibility with the rules. In some cases, the rules engine 110 may flag one or more of the affected elements or relationships and may present the affected elements or relationships on the user interface 102. In such a case, the user may be asked to correct any problems so that the rules engine 110 may proceed.

In some cases, elements and relationships between elements may be created that have circular relationships. In many cases, a circular relationship may not be permitted by the rules defining the diagram type. For example, a Gantt chart may not permit dependent relationships between two activities that are sequential. A Gantt chart may not permit a first item to be dependent on a second item that is dependent on the first item. A rule for a Gantt chart may be capable of identifying the circular relationship and handling the relationship in several manners.

In one manner, a circular relationship may be handled by breaking the circular relationship. A rule may identify one of the relationships between various elements can be discarded so that the circular relationship may be corrected. An example of such a rule may identify the last relationship created that caused the circular relationship and remove that relationship.

In another manner, a circular relationship may be handled by highlighting the circular relationship so that a user may correct the problem. A rule may change the color of the elements and relationships or otherwise flag the circular relationship so that the user's attention is draw to it.

Many different types of diagrams may have specific types of circular relationships that may not be permitted in the diagram. The rules for identifying and handling those instances may vary extensively with the type of diagram.

In an example of a sequence diagram, two items may be defined in a so-called diagonal relationship. In a typical sequence diagram, messages may be illustrated as horizontal arrows between two objects. The sequence diagram may be arranged in a timeline fashion with the sequence progressing from top to bottom. In a sequence diagram, a diagonal relationship may be created to force the rules engine 110 to attempt to reorganize or re-sort the messages so that the sequence conforms to the rule of horizontal messages. A user may create a diagonal relationship in a sequence diagram and the rules engine 110 may attempt to relayout the diagram to conform to the rule.

The rules engine 110 may take the various elements and relationships and may attempt to construct a diagram that complies with the rules in the rules database 112. In many cases, a diagram may have many characteristics that may be defined by the user and for which no rule defines. In some cases, a diagram may have some rules that are optional.

For example, a diagram may have several elements arranged in an arbitrary placement. Various relationships may be established between the elements. The diagram as created may comply with the rules, but additional or optional rules may be applied to reorder the elements, evenly position the elements, or otherwise clean up or reorganize the diagram.

In many embodiments, a user may indicate whether certain optional rules may be applied to the diagram. In some cases, the user may wish to have the rules engine 110 reorganize and relayout the diagram and then continue working without subsequent reorganization.

Some embodiments may allow a subset of elements to be selected for the optional rules. In an example of a sequence diagram, several objects may be placed in a sequence diagram by a user, and the objects may be spaced apart at random intervals where some objects are close together and others further apart. A rule for the sequence diagram may enable the user to select several of the objects and evenly space the objects apart. In some embodiments, a rule may be selected to reorder the objects using relationships between the objects, by alphabetical order, or using some other factor.

The rules engine 110 may be capable of processing a subset of the diagram 104 at a time. The rules engine 110 may apply rules to the subset of elements and relationships while not applying the rules to the remaining elements and relationships. In some embodiments, the remaining elements and relationships may be analyzed using background processes 116. In such an embodiment, the rules engine 110 may process the viewable items quickly and then follow up with the remaining items later.

Once the rules engine 110 has processed at least a portion of the diagram 104, the display generator 114 may display the diagram on the user interface 102. The display generator 114 may indicate those areas of the diagram 104 that have not been updated or are being updated by the background processes 116. Various methods may be used to indicate which portions of the diagram 104 that have not been updated, including graying-out those portions, applying transparency to those portions, locking those portions from editing, shirking or resizing those portions, and changing the color or other visual attributes of those portions.

In some embodiments, the background processes 116 may update the diagram incrementally and may communicate those updates to the display generator 114 as the updates complete.

The subset of the diagram that is processed by the rules engine 110 initially may be selected in a number of different manners. For a particular diagram type, there may be a predetermined number of elements and relationships that may be processed by the rules engine 110 and give the overall system acceptable performance.

In some cases, the predetermined number may be determined dynamically based on an expected response time and previous update performance. In such a case, the rules engine 110 may track the time for updating a specific number of elements and relationships and may adjust the number of elements and relationships up or down based on a requested response time. For example, a system may be configured to return the initial processing of the rules engine 110 in two seconds. An initial update may process 1000 items in 4.0 seconds. In order to meet the processing goal of two seconds, the next processing of the rules engine 110 may be done using 500 items. Such a system may update and refine the predetermined number of elements and relationships over time.

When a predetermined number of elements is used, the rules engine 110 may gather those elements on a priority basis. For example, the highest priority elements may be those that are both currently displayed and recently updated. The second highest priority may be those elements that are related to the changed elements, and the third priority may be the remaining elements that are displayed. A fourth priority may be those elements outside of the display area. By gathering elements based on a priority, the predetermined number of elements may be analyzed in each pass, and the number may be larger or smaller than the number of elements currently displayed.

The subset of elements and relationships may be selected using other mechanisms. For example, the subset may be chosen as those elements and relationships currently being displayed in a display window. In another example, the subset may be chosen as those items being displayed plus those items not displayed but to which a relationship to a displayed item exists.

In still another example, the last modified items may be selected along with those unmodified items having at least one degree of relationship to the modified items.

Each embodiment may have different logic and different algorithms for selecting a subset of elements and relationships to process initially. In some cases, two or more different methods may be used within the same embodiment based on different conditions.

Figure 2:
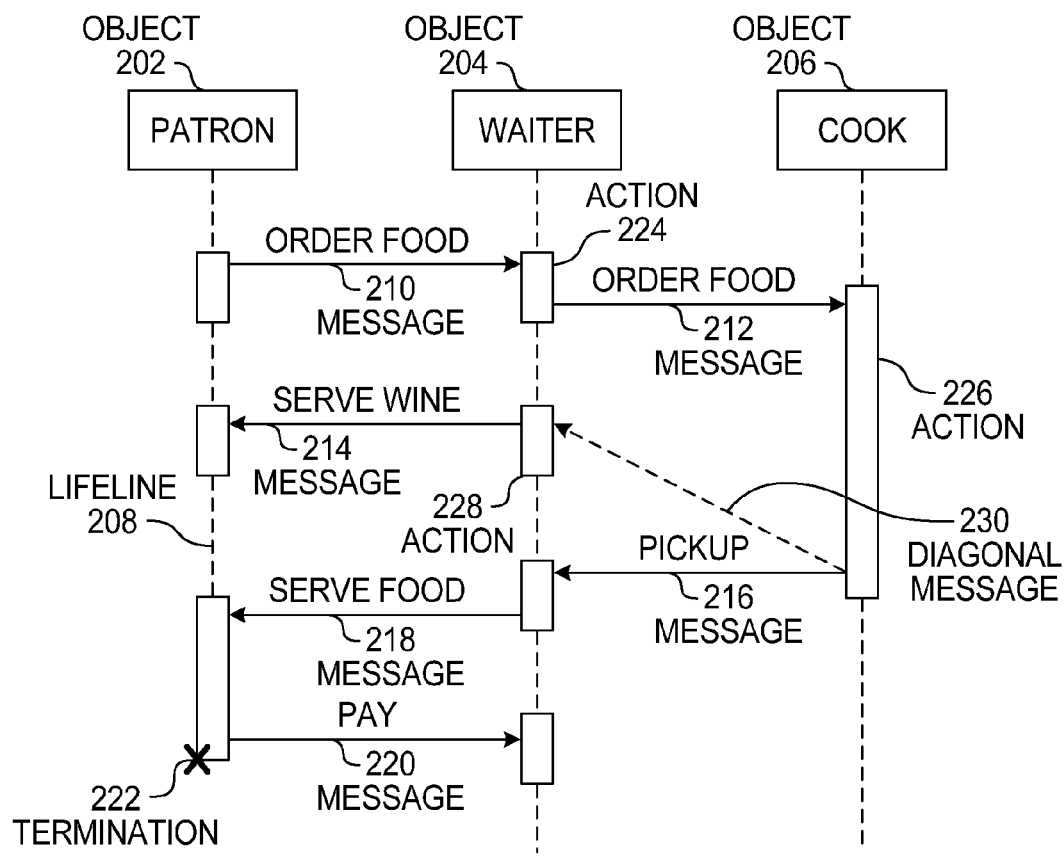
FIG. 2 is a diagram illustration of an embodiment showing an example of a sequence diagram.

FIG. 2 is an example of an embodiment 200 of a sequence diagram. Embodiment 200 is an example of a sequence diagram similar to the Unified Modeling Language sequence diagrams.

A sequence diagram typically has several objects 202, 204, and 206 that may interact. Each object may be represented by a lifeline. For example object 202 may be represented by lifeline 208.

Each interaction between two objects may be represented by a message, such as messages 210, 212, 214, 216, 218, and 220. The messages are arranged in sequence such that the messages are in chronological order from the top to the bottom.

In embodiment 200, an object 202 may represent a patron to a restaurant. The patron may order food as represented by message 210, and may communicate with the waiter as object 204. The waiter may then communicate with the cook as object 206 using the message 212 to communicate the food order.

Since the patron to waiter communication occurs before the waiter to cook communication, message 210 is illustrated as being above the message 212. The action element 224 illustrates the action performed by the waiter between receiving message 210 and transmitting message 212.

Continuing with the example, the message 212 containing a food order to the cook may result in action element 226 that may represent the cook's preparation of the food. After the food is prepared, the food may be picked up by the waiter in message 216 and served to the patron in message 218. While the food is being prepared, the waiter in object 204 may serve wine as represented in message 214.

After the patron in object 202 has finished eating, the patron may pay the waiter as represented by message 220. In the sequence diagram, the patron's lifeline 208 may be terminated as indicated by the termination indicator 222. The termination indicator 222 may represent that the patron has left the restaurant.

A sequence diagram may be used to illustrate the communication between different actors over time. A representation of a communication is shown by a horizontal arrow from one lifeline to another. Each lifeline may represent the existence and actions taken by an actor.

When creating a sequence diagram, a diagonal connection may be any connection that illustrates a message in a non-horizontal configuration. A rules engine may be able to adjust the position of the various action elements and other messages so that an updated sequence diagram conforms to the rule concerning horizontal messages.

For example, a user may edit the sequence diagram of embodiment 200 to have create a diagonal message 230 from the end of action element 226 to the action element 228. The diagonal message 230 may be detected by the rules engine and the action 228 and message 214 may be moved to be in parallel with message 218.

Figure 3:
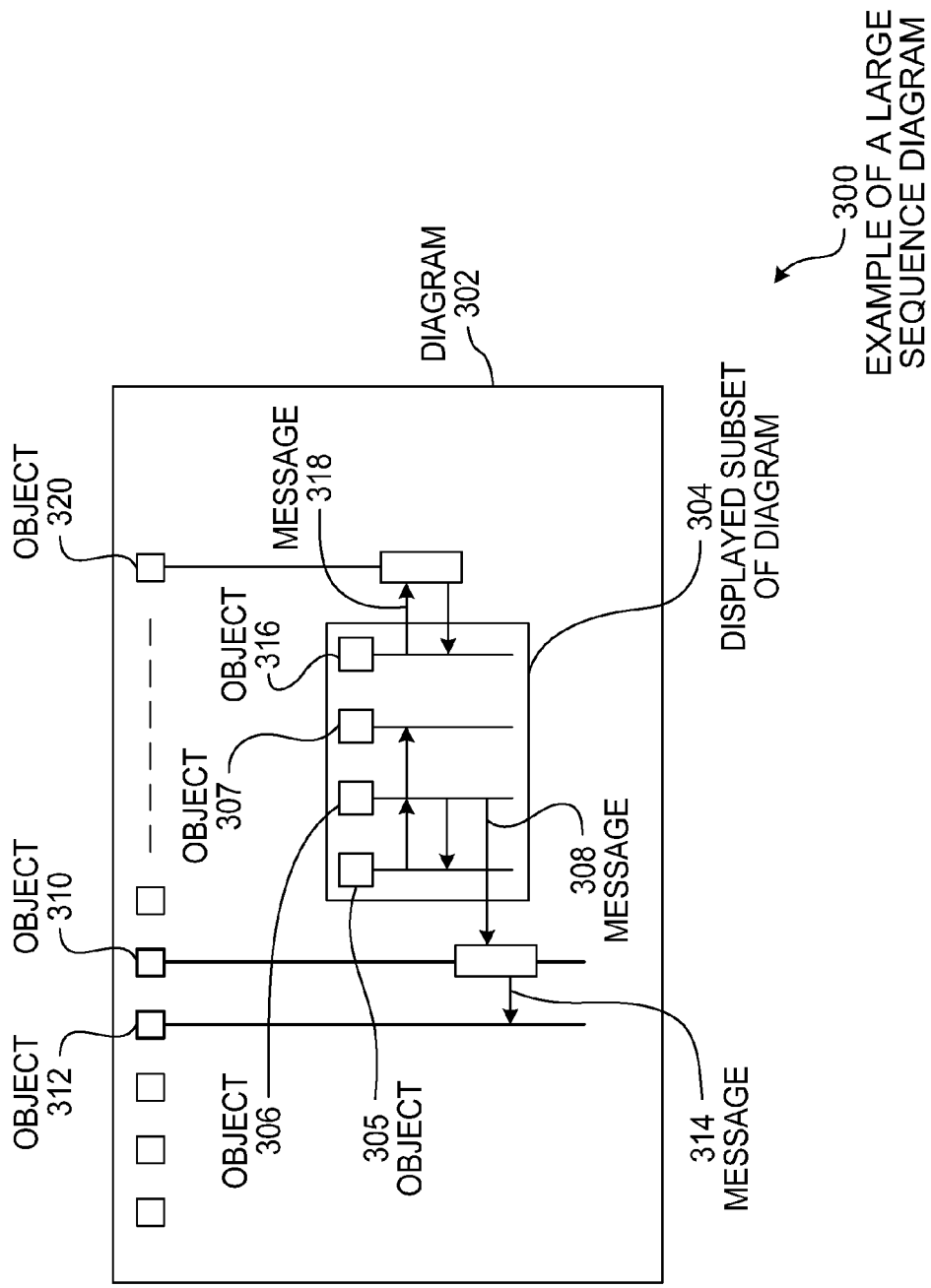
FIG. 3 is a diagram illustration of an embodiment showing an example of a large sequence diagram.

FIG. 3 is an example of an embodiment 300 of a large sequence diagram. Embodiment 300 illustrates a large diagram 302 and a displayed subset 304 of the diagram 302.

The displayed subset 304 may be a window that displays objects 305, 306, 307, and 316 out of all the available objects. The displayed subset may illustrate a portion of the messages between the displayed objects.

When large diagrams such as embodiment 302 are created, the application of the defining rules of the diagram may consume a large amount of processing power. In order to increase the performance of the user experience, a rules engine may process a subset of the elements and relationships in the diagram so that the user may have operate on an updated diagram without having to experience a delay that may be caused when the entire diagram is analyzed.

Several different mechanisms may be used to select the subset of elements and relationships to analyze.

In one mechanism, the elements and relationships within the displayed subset 304 may be selected.

In another mechanism, the changed elements or some other subset within the subset 304 may be selected.

In still another mechanism, a viewable or a changed item may be updated along with any element having one, two, or higher degrees of relationships with the element. In some cases, the related element may be outside the viewable subset 304.

A single degree of relationship may be defined as any element that may be connected to a selected element by a relationship. A second degree of relationship may be those elements connected through two relationships.

In an example of an object having a one degree of relationship, object 320 is outside the viewable subset 304, but is related to object 316 by message 318. In another example, object 310 is outside the viewable subset 304 but is related to object 306 by message 308.

A second degree of relationship may be illustrated by object 312 that is related to object 306 through message 308 and message 314.

In some embodiments, a predetermined number of elements and relationships may be selected for a subset of elements and relationships for processing by a rules engine. In some embodiments, such a selection may result in a subset of displayed elements and relationships or a superset of displayed elements and relationships.

In some embodiments, a subset of elements and relationships may be selected by identifying those elements that have been recently added or modified and traversing various relationships to identify other affected elements and relationships. Such affected elements and relationships may be inside or outside the subset of displayed items.

FIG. 4 is a flowchart illustration of an embodiment 400 showing a method for updating a diagram. Embodiment 400 illustrates a method for identifying a subset of a diagram and analyzing the subset. Embodiment 400 also illustrates the creation or editing of such a diagram.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 begins by creating or modifying an element in block 402 and defining or modifying a relationship in block 404. In many embodiments, a graphical user interface may be used along with various input and display devices to create, delete, edit, modify, or otherwise manipulate items on a diagram. The items may be manipulated without having rules immediately applied.

In such a use scenario, a user may place various elements on a diagram and define relationships between the elements. At some point, a decision in block 406 may launch a sequence to apply rules to the elements and relationships.

In many cases, the user may determine when the rules are applied. In an example of such a case, the user may select to apply the rules in block 406. In other cases, the determination to apply the rules in block 406 may be automatically performed.

When the rules are to be applied in block 406, and a full update is selected in block 408, all the elements of the diagram may be selected in block 410. The elements may be analyzed in block 416 by positioning the elements according to the rules of the diagram.

A full update in block 408 may be determined by an analysis of the number of elements and relationships. When a relatively small number of elements and relationships exist, a full update in block 408 may be performed without a large performance cost.

In some cases, a user may select an option, enter a command, or otherwise indicate that a full update is to be done in block 408.

If a partial update is to be performed in block 408, a number of elements to update is determined in block 412, and a subset of elements may be selected in block 414. The subset may be analyzed in block 416 by positioning the elements according the rules defining the diagram.

The subset of elements selected in block 414 may be selected by many different methods. Examples of such methods include selecting those elements that are displayed, selecting modified or changed elements, selecting elements that are related to selected or displayed elements, and other methods.

After selecting the subset of elements in block 414, and in parallel with the analysis in block 416 of the subset, the remaining elements may be selected in block 420.

If background updating is selected in block 422, a background process may be started in block 428 to update the remaining elements.

If background updating is not selected in block 422, the remaining items may not be updated until requested. When an update command is received in block 424, all of the elements may be updated in block 420 and displayed in block 418. Until an update command is received in block 424, the block 424 may loop back on itself in a waiting mode.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    applying a set of rules to create a first displayed diagram, the set of rules defining positional arrangements of elements based on relationships between the elements;
    selecting a first subset of the diagram to display;
    identifying a second subset composed of the elements and the relationships not in the first subset;
    displaying at least a portion of the first subset on a user interface and not displaying the second subset;
    receiving a user input comprising a change to at least one of the elements in the first subset;
    selecting a third subset of the elements, the third subset comprising the one of the elements and at least a portion of the first subset;
    applying the set of rules to the third subset to create an updated portion of the diagram; and
    displaying at least a portion of the updated portion on the user interface.

2. The method of claim 1, wherein the diagram is a Gantt chart.

3. The method of claim 1, wherein the diagram is a sequence diagram.

4. The method of claim 1, the rules comprising spacing of the elements with respect to each other.

5. The method of claim 1, the rules comprising resolution of diagonal relationships.

6. The method of claim 1, the rules comprising circular relationship identification.

7. The method of claim 1, the third subset not including elements from the second subset.

8. The method of claim 1, wherein the third subset comprises a portion of the second subset.

9. The method of claim 8, wherein selecting the third subset further comprises:
    identifying at least one of the elements from the first subset to form a first group of elements; and
    for one of the elements in the first group of elements, identifying a relationship to a first element in the second subset and including the first element in the third subset.

10. The method of claim 1, wherein the third subset comprises a portion of the first subset.

11. The method of claim 1 further comprising:
    identifying a fourth subset comprising the elements not in the third subset; and
    applying the set of rules to the fourth subset to create an updated diagram.

12. The method of claim 11, wherein applying the set of rules to the fourth subset is performed after the displaying at least a portion of the updated portion.

13. The method of claim 12, wherein applying the set of rules to the fourth subset is performed by a background process.

14. A computer readable storage medium, excluding transmission media, comprising computer executable instructions adapted to perform the method of claim 1.

15. A method comprising:
    capturing from a user interface a diagram having elements and relationships between the elements;
    selecting a first subset of the diagram, the first subset being a portion of the diagram to be displayed;
    selecting a second subset of the diagram, the second subset comprising elements not contained in the first subset;
    analyzing the first subset using a rules database to adjust at least one displayable characteristic of a first element of the elements, the rules database comprising a set of rules defining how the elements are to be displayed based on the relationships;
    updating a portion of the diagram using the adjusted at least one displayable characteristic, while not updating at least one displayable characteristic of a second element of the second subset, the second element having changed as a result of the rules database; and
    displaying the updated portion of the diagram.

16. The method of claim 15 wherein the diagram is a sequence diagram.

17. The method of claim 15 further comprising:
    applying the set of rules in the rules database to the second subset, wherein the applying is performed as a background process.

18. A computer readable storage medium, excluding transmission media, having computer executable instructions that when executed cause a computer to:
    capture from a user interface a diagram having elements and relationships between the elements;
    select a first subset of the diagram, the first subset being a portion of the diagram to be displayed;
    select a second subset of the diagram, the second subset comprising elements not contained in the first subset;
    analyze the first subset using a rules database to adjust at least one displayable characteristic of a first element of the elements, the rules database comprising a set of rules defining how the elements are to be displayed based on the relationships;
    apply the rules database to the second subset using a background process;
    update a portion of the diagram using the adjusted at least one displayable characteristic, while not updating at least one displayable characteristic of a second element of the second subset, the second element having changed as a result of the rules database; and
    display the updated portion of the diagram on the user interface.

19. The computer readable storage medium of claim 18 wherein the set of rules comprises:
    spacing of said elements with respect to each other;
    resolution of diagonal relationships; and
    circular relationship identification.

20. The computer readable storage medium of claim 18 further comprising instruction to:
    identify at least one of the elements from the first subset to form a first group of elements; and for one of the elements in the first group of elements, identify a relationship to a first element in the second subset and including the first element in a third subset.

\* \* \* \* \*